No. 786,987. PATENTED APR. 11, 1905.
J. OPPENHEIMER.
CURLING IRON.
APPLICATION FILED OCT. 26, 1904.

Witnesses
J. M. Hynkoop.
H. White.

Inventor
Julius Oppenheimer
By Knight Bros.
attys.

No. 786,987. Patented April 11, 1905.

UNITED STATES PATENT OFFICE.

JULIUS OPPENHEIMER, OF COLOGNE, GERMANY.

CURLING-IRON.

SPECIFICATION forming part of Letters Patent No. 786,987, dated April 11, 1905.

Application filed October 26, 1904. Serial No. 230,048.

*To all whom it may concern:*

Be it known that I, JULIUS OPPENHEIMER, merchant, a subject of the German Emperor, and a resident of 16 Streitzeuggasse, Cologne-on-the-Rhine, Germany, have invented new and useful Improvements in Curling-Irons, of which the following is a complete specification.

This invention relates to curling-irons to be folded up, of which the construction is improved in such a manner that the means of heating are kept in one of the handles. As fuel solidified methylated spirit in the form of pills will be taken to prevent sooting of the shanks. The other handle consists of a hollow box made of a material of a low caloric conductibility screwed over a kind of burner connected with one of the irons to allow touching although the irons are heated.

Figure 1:
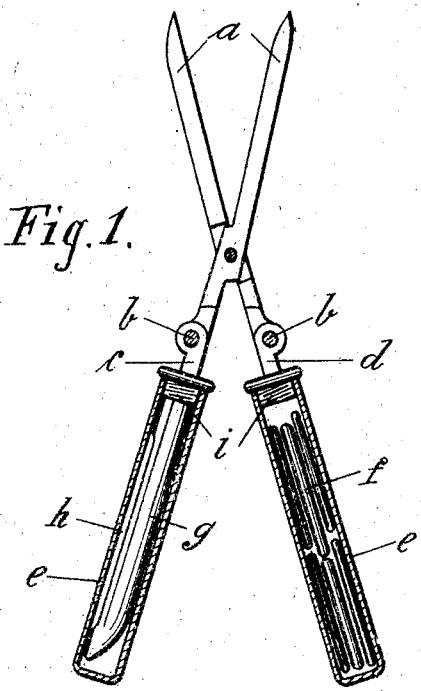
Figure 2:
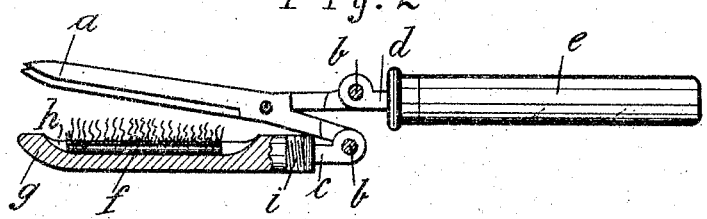
Figure 3:
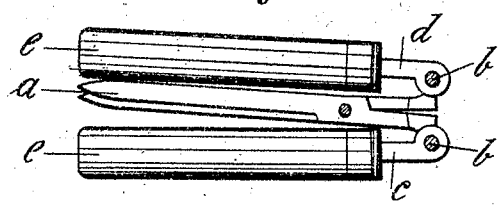

In the accompanying drawings the improved curling-irons are shown in Figure 1 in a side view. Fig. 2 shows same ready for use, and Fig. 3 represents same folded up.

The shanks $a$ are, as usual, pivoted to each other. To the lower ends of these shanks $a$ the holders $e$ $d$ are connected, terminating each in a screw $i$. To the holder $d$ a cylinder $e$ is screwed, provided with internal thread, serving as reservoir for the fuel $f$, consisting of solidified methylated spirit or the like. To the other holder, $c$, a tube $g$ is fixed, provided with a slot $h$, in which one of the pieces of the solidified spirit $f$ can be inserted into tube $g$ and lighted to heat said curling-shanks $a$ $a$ after they are placed over the slot $h$ of the burner $g$, Fig. 2. The shanks will be sufficiently heated when the pill is burned quite up, so that after screwing the hollow cylinder $e$ over the tube $g$ the irons are ready to be used. After use the curling-iron can be folded up, as shown in Fig. 3.

Having thus fully described my invention, what I claim, and desire to secure by Letters Patent, is—

Improved curling-irons comprising in combination with the curling-iron proper, two holders for the handles, one connected to the lower end of each of the shanks, screws forming the end of said holders, a cylinder open at one end and provided with internal screw-thread adapted to be screwed onto the screw of one of the holders adapted to serve as reservoir for the fuel, a tube rigidly fixed to the other holder provided with an oblong slot constructed to serve as burner and another cylinder made of material of low caloric conductibility open at one end, internal threaded to be screwed over said tube, substantially as described and for the purpose set forth.

In testimony whereof I have hereunto set my hand in presence of two subscribing witnesses.

JULIUS OPPENHEIMER.

Witnesses:
 WILLIAM KUEPPERS,
 JOH. SCHULZ.